United States Patent [19]

Suzuki et al.

[11] Patent Number: 5,694,130
[45] Date of Patent: Dec. 2, 1997

[54] VEHICLE-MOUNTED RADAR SYSTEM AND DETECTION METHOD

[75] Inventors: Toshifumi Suzuki; Yuitsu Hayashikura, both of Wako, Japan

[73] Assignee: Honda Giken Kogyo Kabushiki Kaisha, Tokyo, Japan

[21] Appl. No.: 583,996

[22] Filed: Jan. 8, 1996

[30] Foreign Application Priority Data

Jan. 9, 1995 [JP] Japan .................................. 7-001205

[51] Int. Cl.$^6$ ................................................ G01S 13/93
[52] U.S. Cl. ........................................ 342/70; 342/72
[58] Field of Search ........................... 342/70, 71, 72

[56] References Cited

U.S. PATENT DOCUMENTS

| | | | |
|---|---|---|---|
| 4,101,888 | 7/1978 | Heller et al. | 342/111 |
| 4,143,370 | 3/1979 | Yamanaka et al. | 342/72 |
| 4,148,028 | 4/1979 | Fujiki | 342/70 |
| 4,180,816 | 12/1979 | Endo et al. | 342/70 |
| 5,181,037 | 1/1993 | Komatsu | 342/70 |
| 5,302,956 | 4/1994 | Asbury et al. | 342/70 |
| 5,481,268 | 1/1996 | Higgins | 342/70 |
| 5,576,712 | 11/1996 | Bian et al. | 342/160 |

FOREIGN PATENT DOCUMENTS

| | | |
|---|---|---|
| 56-27833 | 2/1981 | Japan . |
| 56-52841 | 4/1981 | Japan . |

*Primary Examiner*—John B. Sotomayor
*Attorney, Agent, or Firm*—Lyon & Lyon LLP

[57] ABSTRACT

Modulation frequency setting device sets the modulation frequency on the basis of the vehicle speed data from a vehicle speed detector and the detected range data, causing a low frequency oscillator to generate a low frequency signal of the set frequency. A transmitter transmits an electromagnetic wave (e.g., infrared light) which have been modulated with the low frequency signal. A phase comparator detects the phase difference between the low frequency signal and a detector output, and a range operating device produces range data. Relative speed operating unit finds the relative speed based on the range data. In case of a high vehicle speed, the modulation frequency is set low to extend the detection range. If an object in a short distance is detected, the modulation frequency is set high to limit the detection range to a short range, thereby enhancing the range resolution.

18 Claims, 5 Drawing Sheets

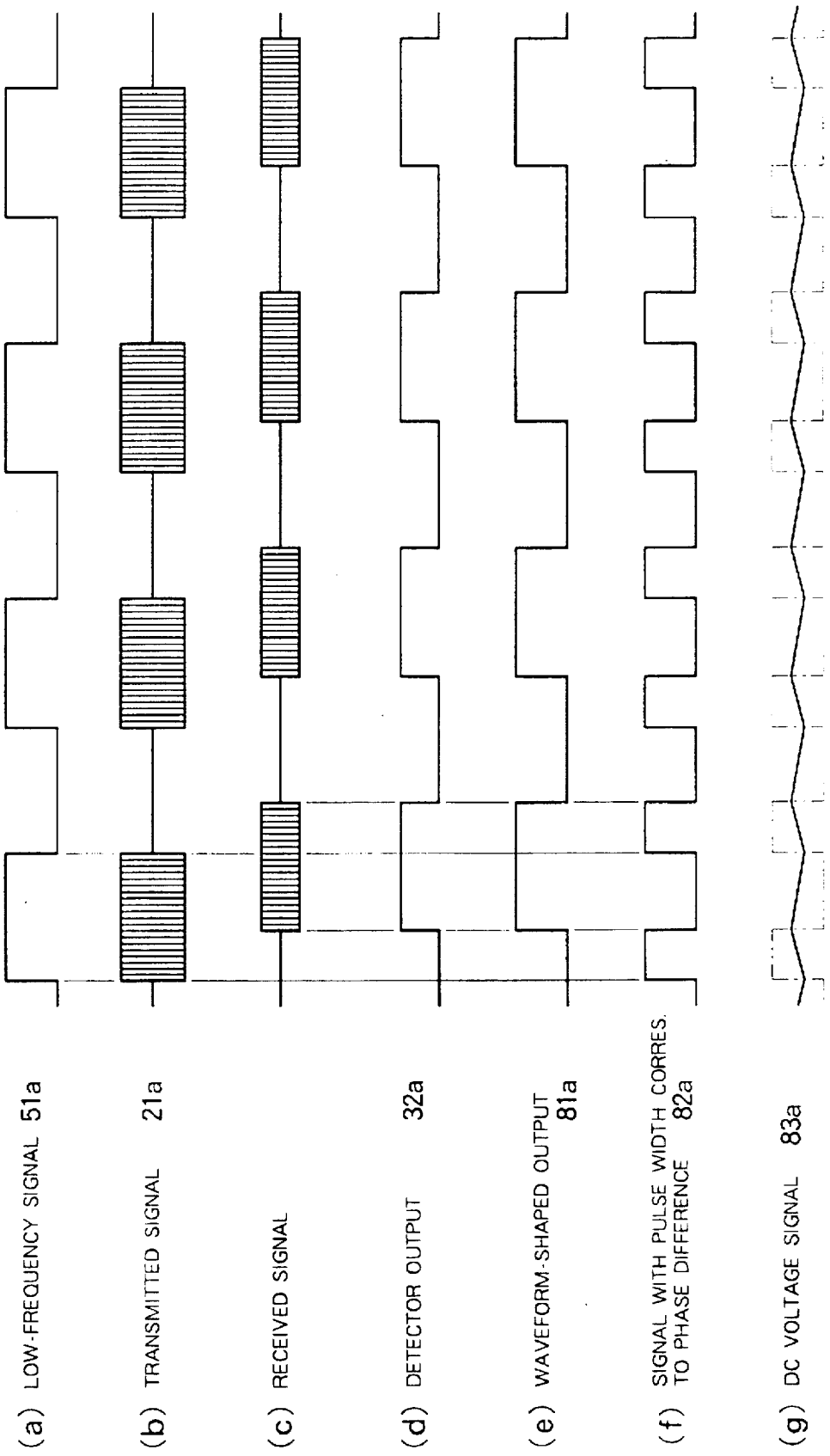

VEHICLE-MOUNTED RADAR SYSTEM AND DETECTION METHOD

BACKGROUND OF THE INVENTION

1. Field of the Invention

The present invention relates to a vehicle-mounted radar system and detection method wherein an electromagnetic wave (e.g., light and millimetric wave), amplitude modulated with a low frequency signal, is radiated for finding the range to or the relative velocity with respect to a target (object to be sensed) on the basis of the phase difference between the low frequency signals in the transmitted wave and a received wave. More particularly, the invention relates to a vehicle-mounted radar system and detection method for detecting the target more appropriately by varying the modulation frequency in response to the traveling speed of the vehicle and the detected range.

2. Description of the Related Art

Japanese Patent Laid-Open Publication Nos. SHO 57-142575 and SHO 57-166573 discloses a microwave range detector adapted to transmit a signal obtained by amplitude modulating a microwave with a low frequency signal, receive an echo or a signal reflected by a target, and measure the range to the target on the basis of the phase difference between a received low frequency signal obtained by amplifying and detecting the received signal and the low frequency signal for the modulation.

In such an AM radar system (range detector), the measurable range is limited by the frequency (period) of the low frequency signal used for modulation. In a vehicle radar system, it is preferable to be able to appropriately detect a target object in response to the traveling state of the vehicle. For example, if the vehicle is traveling at a high speed leaving enough room between the traveling vehicle and the vehicle in front, the maximum detectable range is preferably set for, e.g., about 150 m so that a vehicle relatively further ahead can be detected. If the target is relatively near as in case of garaging, it is preferable to be able to measure a range with a range resolving power on the order of several centimeters. Also in detection of the relative speed, if the range to the target is short, more precise detection is desirable.

It is therefore an object of the invention to provide a vehicle-mounted radar system and a detection method which can detect a target with an appropriate range resolving power in response to the range to the target and also detect the relative speed with an appropriate precision in response to the range to the target.

SUMMARY OF THE INVENTION

The above mentioned object is achieved by a vehicle-mounted radar system according to the present invention, which comprises a transmitter for radiating an electromagnetic wave, which has been amplitude or on-and-off modulated with a low frequency (LF) modulation signal, a receiver for receiving and detecting a reflected electromagnetic wave from a target, a range measuring unit for detecting the range to the target on the basis of the phase difference between an LF signal received by the receiver and the LF modulation signal, a relative speed operating unit for calculating the relative speed with respect to the target on the basis of range data output from the range measuring unit, a vehicle speed detector for detecting the traveling speed of a vehicle to which the system is mounted and outputting vehicle speed data, and a modulation frequency shifter for shifting the frequency of the LF modulation signal in response to the vehicle speed data and the range data from the range measuring unit.

The modulation frequency shifter comprises a modulation frequency setting device for setting the frequency of the LF modulation signal on the basis of the vehicle speed data and the range data and outputting modulation frequency data, and an LF oscillator for generating the LF modulation signal of the set frequency on the basis of the modulation frequency data.

The range measuring unit comprises a phase comparator for detecting the phase difference between the received LF signal output from the receiver and the LF modulation signal, and outputting a phase difference signal, and a range operating device for operating a range on the basis of the phase difference signal and the modulation frequency data and outputting the range data.

The phase comparator comprises a wave-shaping circuit for generating a wave-shaped output obtained by wave-shaping a detected output from the receiver, a phase difference detector for detecting the phase difference between the LF modulation signal and the wave-shaped output and outputting a signal with a pulse width corresponding to the phase difference; a smoothing circuit for smoothing the signal with the pulse width and outputting a DC voltage signal, and an A/D converter for A/D converting the DC voltage signal and outputting range data corresponding to the phase difference.

The transmitter has an oscillator, which is designed to generate infrared laser light or a high frequency signal of a millimetric wave band.

The vehicle-mounted radar system may be so designed as to shift the frequency of the LF modulation signal only in response to the range data from the range measuring unit.

The detection of the relative speed with respect to the target is achieved through the detection based on a change in the measured range data with the passage of time.

Since the vehicle-mounted radar system is so designed as to shift the frequency of the LF modulation signal for amplitude or on-and-off modulation in response to the traveling speed of the vehicle and the range to the target, detection up to a long range is possible by lowering the modulation frequency if the vehicle is traveling at a high speed, and range measurement is possible with high precision on the order of several cm by setting the modulation frequency high to raise the range resolution if the vehicle is traveling at a low speed, or the target is in a close range. By raising the precision of range measurement, the precision of detection of the relative speed is also raised.

Further, since the vehicle-mounted radar system is so designed as to shift the frequency of the LF modulation signal for amplitude or on-and-off modulation only in response to the range to the target, range measurement may be performed with high precision by setting the modulation frequency high to raise the range resolution when the target is in a close range, and detection up to a long range is possible by lowering the modulation frequency when there is no object in a short range. By raising the precision of range measurement, the precision in detecting the relative speed is also raised.

BRIEF DESCRIPTION OF THE DRAWINGS

Preferred embodiments of the present invention will now be described in detail, by way of example only, with reference to the accompanying drawings, in which:

FIG. 5 is a timing chart showing operation of the phase comparator.

DETAILED DESCRIPTION OF THE PREFERRED EMBODIMENTS

Figure 1:
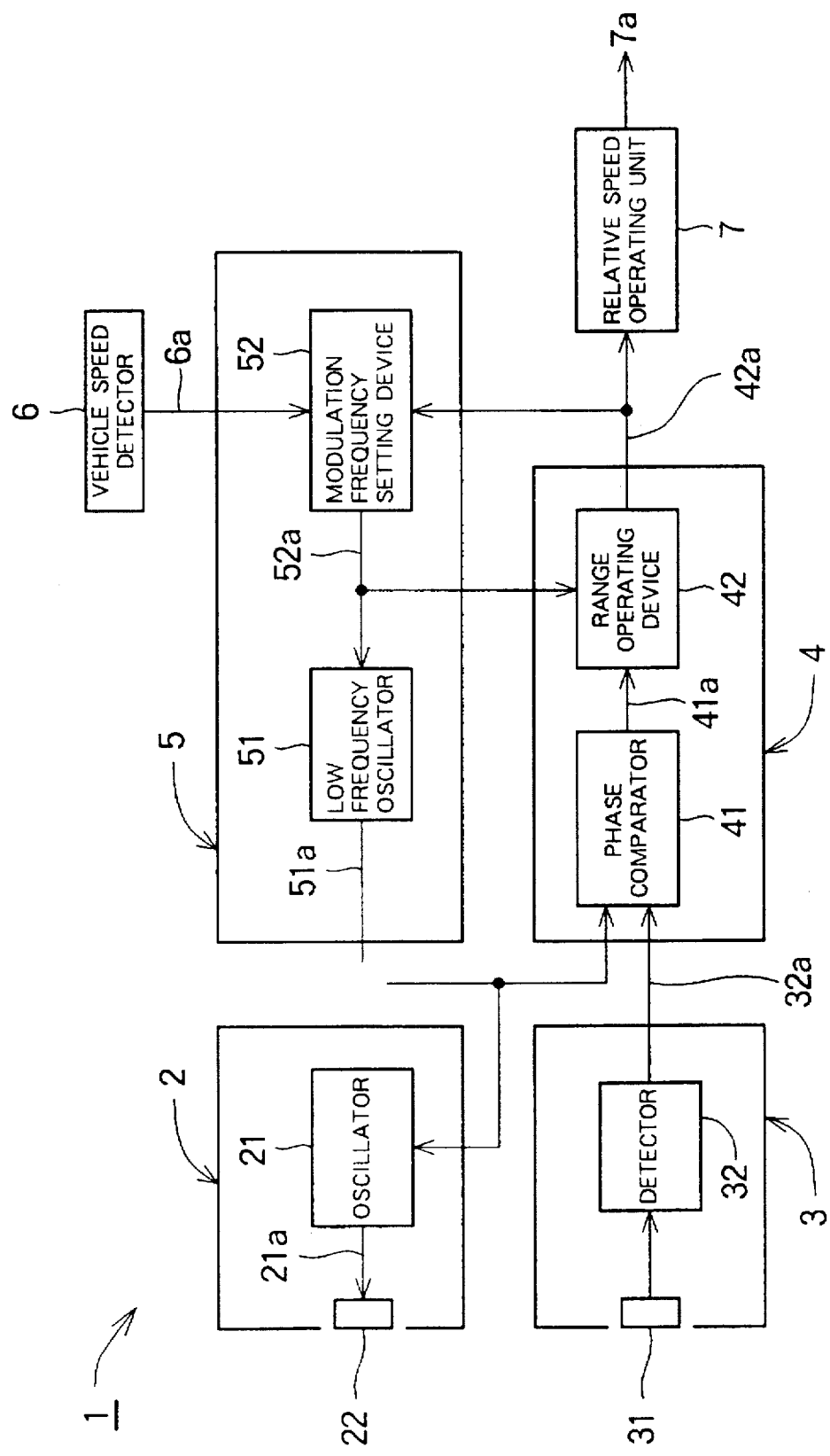
FIG. 1 is a block diagram of a vehicle-mounted radar system according to the invention.

As shown in FIG. 1, a vehicle-mounted radar system 1 according to the invention comprises a transmitter 2, a receiver 3, a range measuring section 4, a modulation frequency changer 5, a vehicle speed detector 6, and a relative speed calculator 7.

The transmitter 2 is provided with an oscillator 21 and a transmitting lens. The oscillator is provided with a laser oscillator for emitting infrared light, and is adapted to generate a light signal 21a which has been amplitude-modulated (light-intensity-modulated) on the basis of a low frequency (LF) modulation signal 51a supplied from an LF oscillator 51 of the modulation frequency changer 5. The LF modulation signal 51a and the light signal 21a are shown respectively as a pulse-like rectangular wave and a modulated wave modulated in an on and off fashion in response to the rectangular wave in FIG. 2. The light signal 21a is radiated through the transmitting lens 22. Alternatively, the transmitter 2 may be replaced by an arrangement in which, for example, a high frequency oscillator of millimetric wave band is used for the oscillator 21, a high frequency signal (carrier signal) oscillated by the high frequency (HF) oscillator is modulated with the LF modulation signal 51a, and the resultant signal is radiated in the form of an electromagnetic wave from a transmitting antenna.

The receiver 3 receives a (light) signal (echo) reflected by a target (object to be detected) through the receiving lens 31, the detector 32, provided with a light receiving element, detects the received light signal and outputs a received LF signal (detector output) 32a. If, for example, an electromagnetic wave in the millimetric wave band is to be received by the receiver 3, then the receiver 3 has only to be so constructed as to comprise a receiving antenna, a HF amplifier, and a detector.

The range measuring section 4 comprises a phase comparator 41 for detecting the phase difference between the LF modulation signal 51a and the received LF signal 32a output from the detector 32 and outputting a phase difference signal 41a, and a range calculator 42 for operating a range on the basis of the phase difference signal 41a and modulation frequency data 42a and outputting range data 42a.

The relative speed calculator 7 calculates and outputs data indicative of the relative speed of the vehicle with respect to the target on the basis of the range data 42a, sequentially output from the range measuring section 4.

The modulation frequency changer 5 comprises modulation frequency setting circuit for outputting modulation frequency data 52a on the basis of the range data 42a and vehicle speed data 6a supplied from the vehicle speed detector 6, and an LF oscillator 51 for generating an LF rectangular (pulse) signal 51a of a specified frequency based on the modulation frequency data 52a.

The modulation frequency setting circuit 52 shifts the maximum detecting range by shifting the modulation frequency in multiple steps in response to the traveling speed of the vehicle and the range to the target. Specifically, if the vehicle speed is equal to or more than 80 km/h for example, the modulation frequency is set for 1 MHz so as to be able to detect a target up to 150 m away. If the vehicle speed is equal to or more than 40 km/h for example and less than 80 Km/h, the modulation frequency is set for 1.5 MHz so as to be able to detect a target up to 100 m away. If the vehicle speed is less than 40 km/h for example, the modulation frequency is set for 3 MHz so as to be able to detect a target up to 50 m away. Further, If the detected range is less than 20 m, then the modulation frequency is set for 7.5 MHz so as to be able to detect a range up to 20 m.

In an initial state in which range data 42a has not yet been obtained, the modulation frequency setting circuit 52 first outputs the modulation frequency data 52a which designates such modulation frequency as to make the detecting range the maximum.

Figure 3:
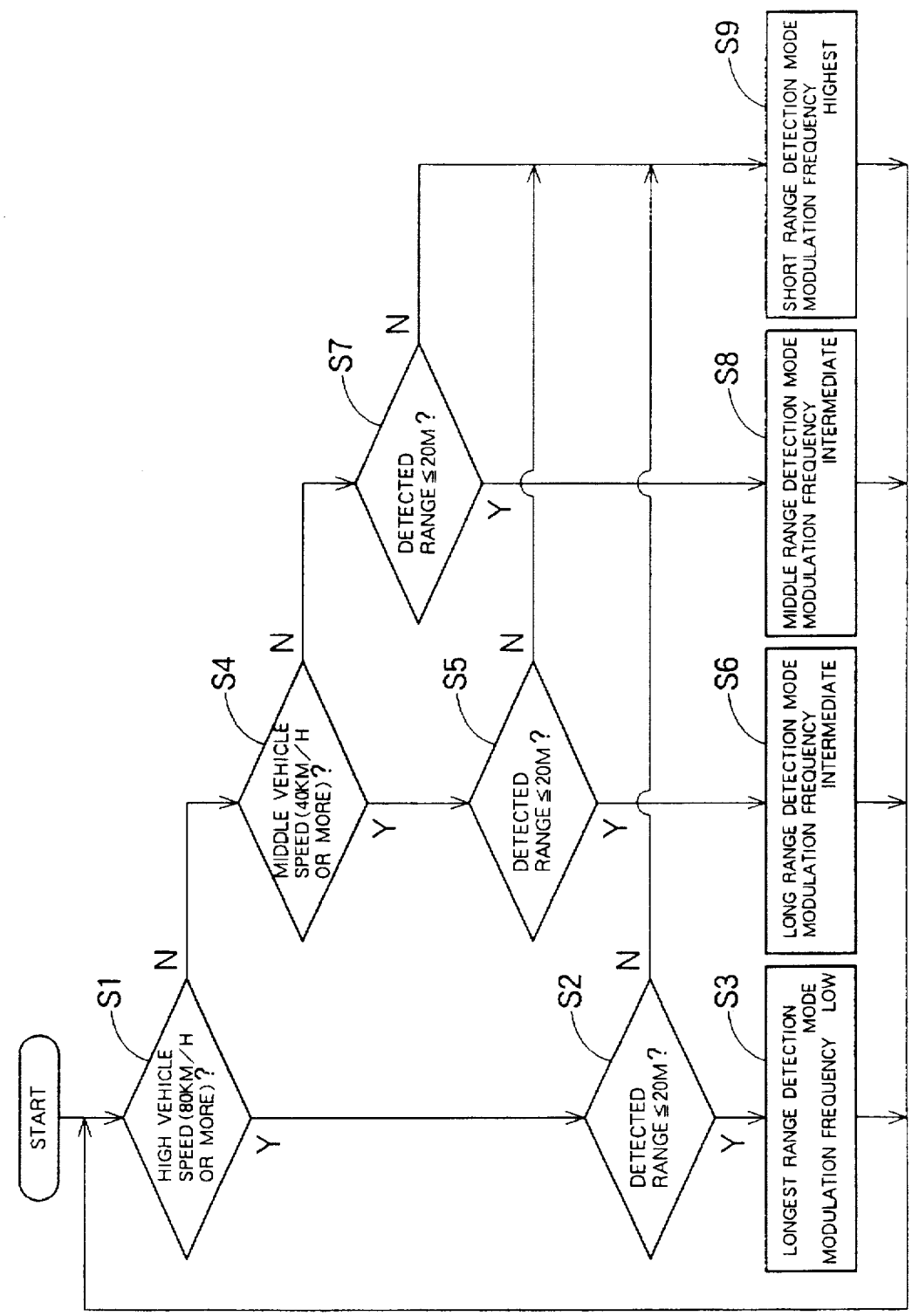
FIG. 3 is a flow chart showing a detection range shifting operation in the vehicle-mounted radar system according to the invention.

FIG. 3 is a flow chart showing an operation in the vehicle-mounted radar system according to the invention. The modulation frequency setting circuit 52 determines, in step 1, if the vehicle speed is a high vehicle speed, e.g., 80 km/h or more on the basis of the vehicle speed data 6a supplied from the vehicle speed detector 6. If the detected range measured in a longest range detection mode (e.g., 150 m) at a high vehicle speed is 20 m or more (step 2), then a low modulation frequency (e.g., 1 MHz) is set to keep the longest range detection mode (for example, a detectable range of 150 m) in step 3. If the vehicle speed is not a high vehicle speed, then, in step 4, the modulation frequency setting circuit 52 determines if the vehicle speed is a middle speed (e.g., 40 km/h or more). If so, and if the detected range is 20 m or more (step 5), then a modulation frequency of, e.g., 1.5 MHz is set to make the detection mode a long range detection mode (e.g., a detectable range of 100 m) in step 6. If the vehicle speed is not a middle speed, it is determined in step 7 whether the vehicle speed is a low vehicle speed (e.g., less than 40 km/h) and the detected range is 20 m or more. If the detected range is 20 m, then a modulation frequency of, e.g., 3 MHz is set to make the detection mode a middle range detection mode (e.g., a detectable range of 50 m) in step 8. And, if the detected range is less than 20 m, a modulation frequency of, e.g., 7.5 MHz is set to make the detection mode a short range detection mode (e.g., a detectable range of 20 m) in step 9.

As described above, the arrangement is constructed such that the modulation frequency is so shifted as to extend the detectable range in response to the vehicle speed and limit the detection range to a short range if the target is in a short range. Therefore, a range measurement with a high range resolution (e.g., several cm) is possible in the short range detection mode even if the phase difference resolution of the phase comparator is constant. Since it is so devised that the detectable range becomes longer with an increase in the vehicle speed if there is no object such as a preceding vehicle in a short range, it is possible to inform the driver of the presence of, e.g., a vehicle ahead in an appropriate timing corresponding to the vehicle speed.

Figure 4:
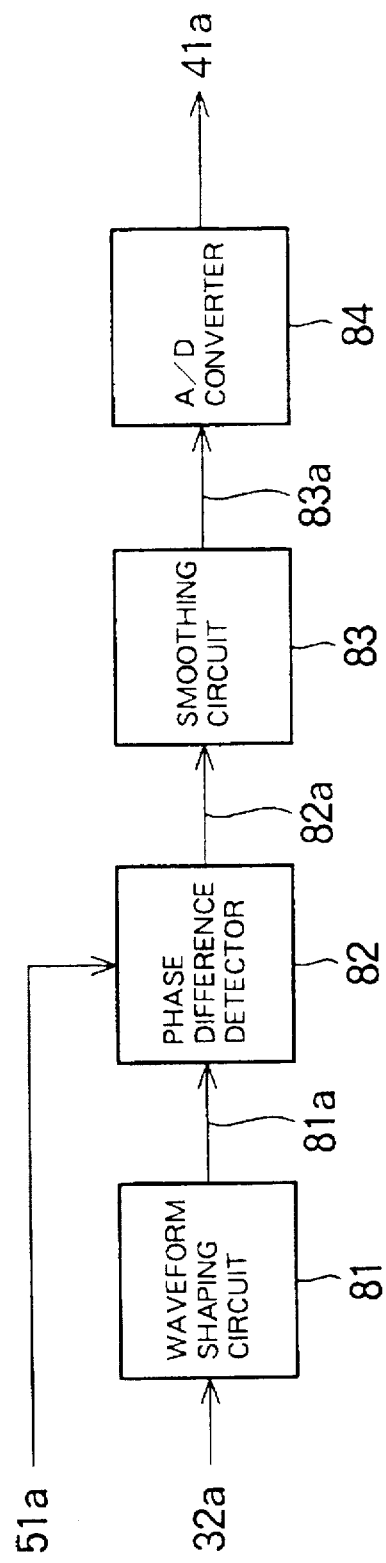
FIG. 4 is a block diagram showing an illustrative embodiment of a phase comparator.
Figure 1:
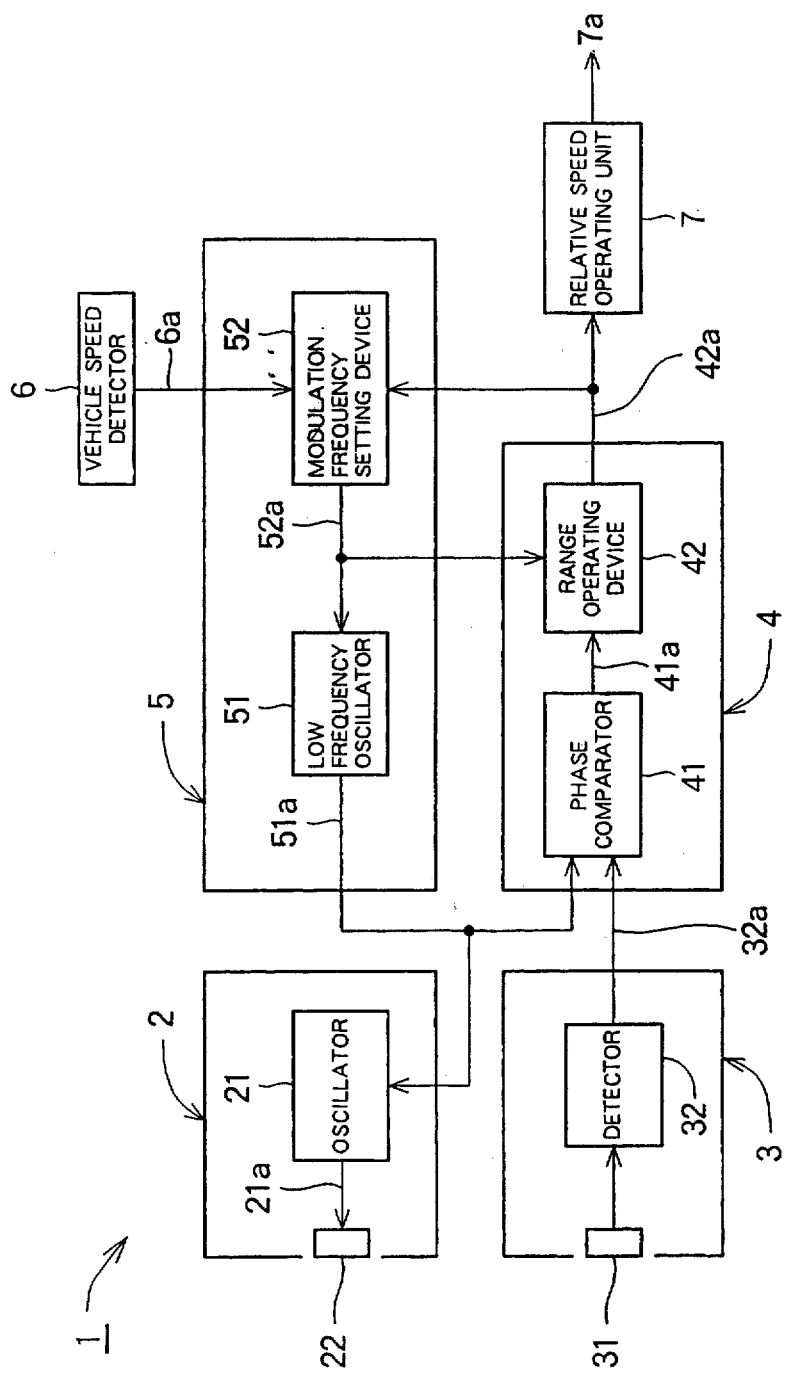
Figure 2:
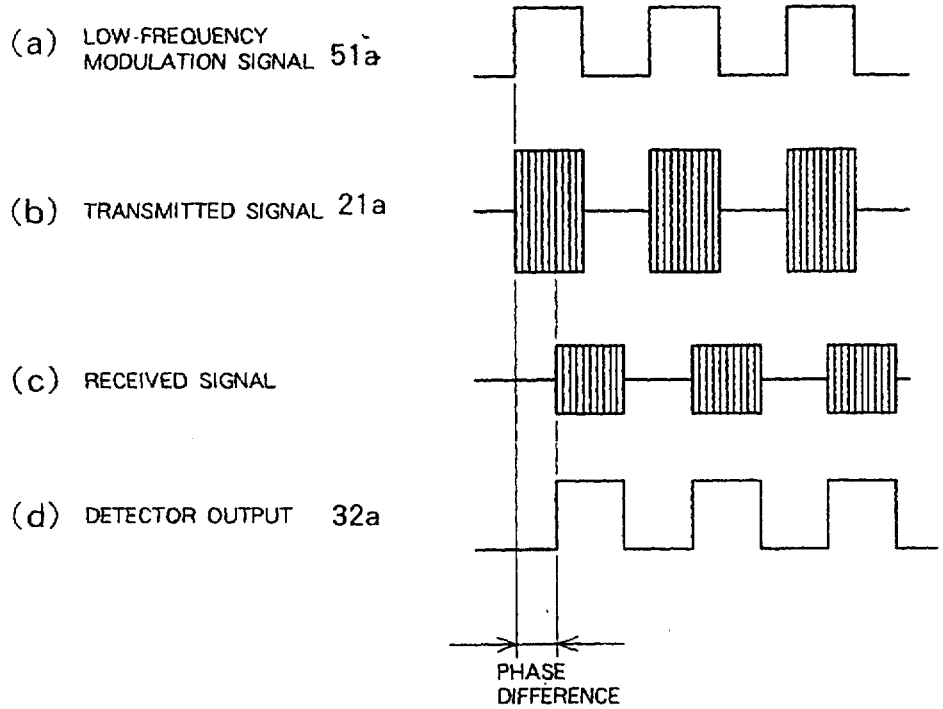

FIG. 4 is a block diagram showing an illustrative embodiment of the phase comparator, and FIG. 5 is a timing chart showing an operation of the phase comparator.

The phase comparator 41 comprises a wave shaping circuit 81 for generating a wave-shaped output 81a in which wave-shaping and binarizing the detector output 32a results, a phase difference detector 82 for detecting the phase difference between the LF rectangular signal 51a corresponding to the transmission signal and the wave-shaped output 81a, and outputting a signal 82a with a pulse width corresponding to the phase difference, a smoothing circuit 83 for smoothing the signal 82a with a pulse width corresponding to the phase difference and outputting a DC voltage signal 83a, and an A/D converter 84 for analog-to-digital converting the smoothed output 83a and outputting data 41a according to the phase difference.

The phase difference detector 82 is formed by, for example, an exclusive OR circuit, and outputs a signal 82a with a pulse width corresponding to the phase difference shown in FIG. 5, (f). Then, the smoothing circuit 83 yields a DC voltage signal 83a as shown in FIG. 5, (g). It is noted that though in FIG. 5, (g), a smoothed pulsating voltage signal is obtained by using a smoothing circuit 83 having a relatively long charging and discharging time constants, an integrating circuit with a short charging time constant and a long discharging time constant may be used to integrate the signal with a pulse width corresponding to the phase difference within a predetermined period of time or a predetermined number of on-off times, and then the integrated output voltage may be analog-to-digital converted.

If an exclusive OR circuit is used as the phase difference detector 82, the smoothed output advantageously contains fewer pulsating components, because the output signal 82a comprises two different kinds of pulses, namely, one corresponding to the phase difference between the rising edges of a transmitted signal pulse and the corresponding received signal pulse and the other corresponding to the phase difference between the falling edges of them. On the other hand, if a plurality of targets exist in different ranges, the duration (pulse width) of a detector output 32a pulse may become longer than that of the corresponding transmitted signal 21a pulse because the reflected signals from the targets overlaps each other with their phase shifted by the time difference corresponding to the distance between the relevant targets. In such a case, the above described phase difference between the rising edges and that between the falling edges are different, that is, the latter is larger than the former, resulting in the measured range being longer than the actual distance with respect to the target at a shortest distance. For this reason, the phase difference detector 82 may be so arranged that it outputs a signal with a pulse width corresponding to the phase from the rising edge of the transmitted signal to that of the received signal.

In FIG. 1, the arrangement is provided with a vehicle speed detector 6. However, instead of being provided with the vehicle speed detector 6, the modulation frequency changer 5 may be so adapted as to change the frequency of the LF signal for amplitude-modulating the HF signal only in response to the range to the detected target. For example, the modulation frequency changer 6 sets the modulation frequency for a lower frequency so as to be capable of detecting up to 150 m in a initial state. If an object is detected within a short range of 15 m, the modulation frequency is changed to ten times the low frequency to measure the range to the object with a high resolution. If no object is detected in the short range detecting mode, modes are changed to the long range detecting mode.

Many widely different embodiments of the present invention may be constructed without departing from the spirits and scope of the present invention. It should be understood that the present invention is not limited to the specific embodiments described in the specification, except as defined in the appended claims.

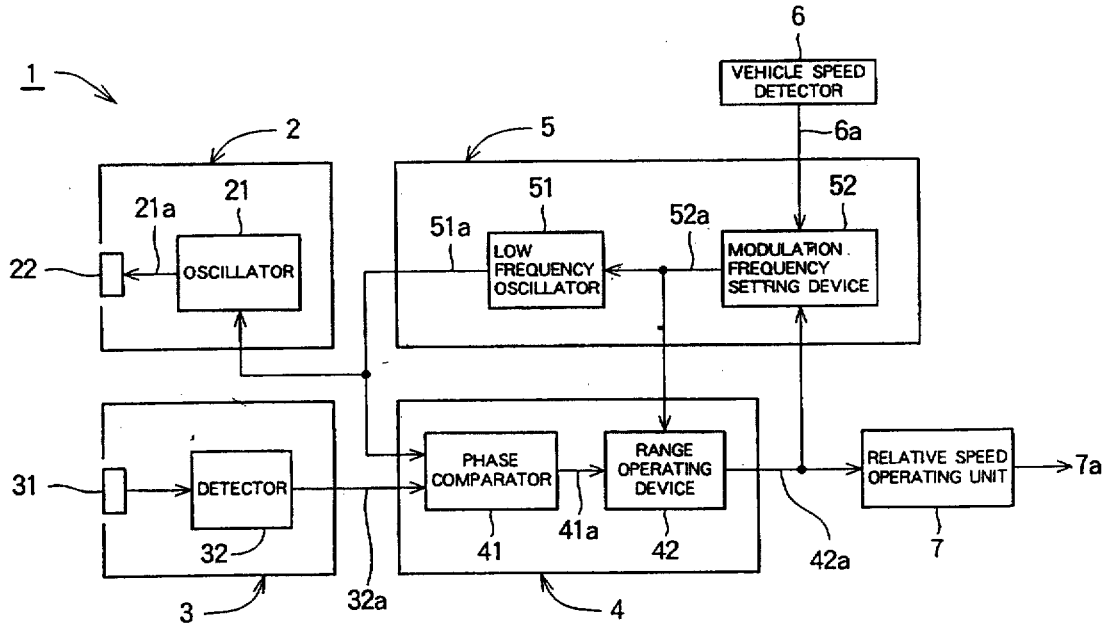

What is claimed is:

1. A vehicle-mounted radar system comprising:

a transmitter for radiating electromagnetic wave which has been amplitude modulated with a low frequency (LF) modulation signal;

a receiver for receiving and detecting reflected electromagnetic wave from a target;

a range measuring unit for detecting the range to said target on the basis of the phase difference between a received LF signal, obtained by said receiver, and said LF modulation signal;

a relative speed operating unit for calculating the relative speed with respect to said target on the basis of range data output from said range measuring unit;

a vehicle speed detector for detecting the traveling speed of a vehicle to which the system is mounted and outputting vehicle speed data; and a modulation frequency shifter for shifting the frequency of said LF modulation signal in response to said vehicle speed data and said range data from said range measuring unit.

2. A vehicle-mounted radar system according to claim 1, wherein said modulation frequency shifter comprises:

a modulation frequency setting device for setting said frequency of said LF modulation signal on the basis of said vehicle speed data and said range data and outputting modulation frequency data; and an LF oscillator for generating said LF modulation signal of said set frequency on the basis of said modulation frequency data.

3. A vehicle-mounted radar system according to claim 1, wherein said range measuring unit comprises:

a phase comparator for detecting the phase difference between the received LF signal output from said receiver and said LF modulation signal and outputting a phase difference signal; and a range operating device for operating a range on the basis of said phase difference signal and said modulation frequency data, and outputting said range data.

4. A vehicle-mounted radar system according to claim 3, wherein said phase comparator comprises:

a wave-shaping circuit for generating a wave-shaped output obtained by wave-shaping a detected output from said receiver;

a phase difference detector for detecting the phase difference between said LF modulation signal and said wave-shaped output, and outputting a signal with a pulse width corresponding to said phase difference;

a smoothing circuit for smoothing said signal with said pulse width, and outputting a DC voltage signal; and an A/D converter for A/D converting said DC voltage signal, and outputting range data corresponding to said phase difference.

5. A vehicle-mounted radar system according to claim 1, wherein said transmitter has an oscillator, and said oscillator generates infrared laser light.

6. A vehicle-mounted radar system according to claim 5, wherein said oscillator generates a high frequency signal of a millimetric wave band.

7. A vehicle-mounted radar system comprising:

a transmitter for radiating electromagnetic wave which has been amplitude modulated with a low frequency (LF) modulation signal;

a receiver for receiving and detecting reflected electromagnetic wave from a target;

a range measuring unit for detecting the range to said target on the basis of the phase difference between a received LF signal, obtained by said receiver, and said LF modulation signal;

a relative speed operating unit for calculating the relative speed with respect to said target on the basis of range data output from said range measuring unit; and a modulation frequency shifter for shifting the frequency of said LF modulation signal in response to said range data from said range measuring unit.

8. A vehicle-mounted radar system according to claim 7, wherein said modulation frequency shifter comprises:

a modulation frequency setting device for setting said frequency of said LF modulation signal on the basis of said vehicle speed data and said range data and outputting modulation frequency data; and an LF oscillator for generating said LF modulation signal of said set frequency on the basis of said modulation frequency data.

9. A vehicle-mounted radar system according to claim 7, wherein said range measuring unit comprises:

a phase comparator for detecting the phase difference between the received LF signal output from said receiver and said LF modulation signal and outputting a phase difference signal; and a range operating device for operating a range on the basis of said phase difference signal and said modulation frequency data and outputting said range data.

10. A vehicle-mounted radar system according to claim 9, wherein said phase comparator comprises:

a wave-shaping circuit for generating a wave-shaped output obtained by wave-shaping a detected output from said receiver;

a phase difference detector for detecting the phase difference between said LF modulation signal and said wave-shaped output, and outputting a signal with a pulse width corresponding to said phase difference;

a smoothing circuit for smoothing said signal with said pulse width, and outputting a DC voltage signal; and an A/D converter for A/D converting said DC voltage signal, and outputting range data corresponding to said phase difference.

11. A vehicle-mounted radar system according to claim 7, wherein said transmitter has an oscillator, and said oscillator generates infrared laser light.

12. A vehicle-mounted radar system according to claim 11, wherein said oscillator generates a high frequency signal of a millimetric wave band.

13. A detection method practiced in a vehicle for radiating an electromagnetic wave which has been amplitude modulated with a low frequency (LF) modulation signal, receiving reflected electromagnetic wave from an object, detecting a received LF signal, and detecting the range to said object or the relative speed with respect to said object on the basis of the phase difference between said received LF signal and said LF modulation signal, said detection method comprising the step of:

shifting the frequency of said LF modulation signal in response to the traveling speed of said vehicle and said range to said object.

14. A detection method according to claim 13, wherein said electromagnetic wave is an electromagnetic wave obtained by amplitude modulation modulation of infrared laser light with said LF modulation signal.

15. A detection method according to claim 13, wherein said electromagnetic wave is electromagnetic wave obtained by amplitude modulating modulating a high frequency signal of a millimetric wave band with said LF modulation signal.

16. A detection method practiced in a vehicle for radiating electromagnetic wave which has been amplitude modulated with a low frequency (LF) modulation signal, receiving reflected electromagnetic wave from an object, detecting a received LF signal, and detecting the range to said object or the relative speed with respect to said object on the basis of the phase difference between said received LF signal and said LF modulation signal, said detection method comprising the step of:

shifting the frequency of said LF modulation signal in response to said range to said object.

17. A detection method according to claim 16, wherein said electromagnetic wave is an electromagnetic wave obtained by amplitude modulation modulation of infrared laser light with said LF modulation signal.

18. A detection method according to claim 16, wherein said electromagnetic wave is electromagnetic wave obtained by amplitude modulating modulating a high frequency signal of a millimetric wave band with said LF modulation signal.

* * * * *

UNITED STATES PATENT AND TRADEMARK OFFICE
CERTIFICATE OF CORRECTION

PATENT NO : 5,694,130
DATED : December 2, 1997
INVENTOR(S) : Suzuki, et al.

It is certified that error appears in the above-identified patent and that said Letters Patent is hereby corrected as shown below:

Delete Title page, showing illustrative figure, replace with attached pages.

Figure 2:
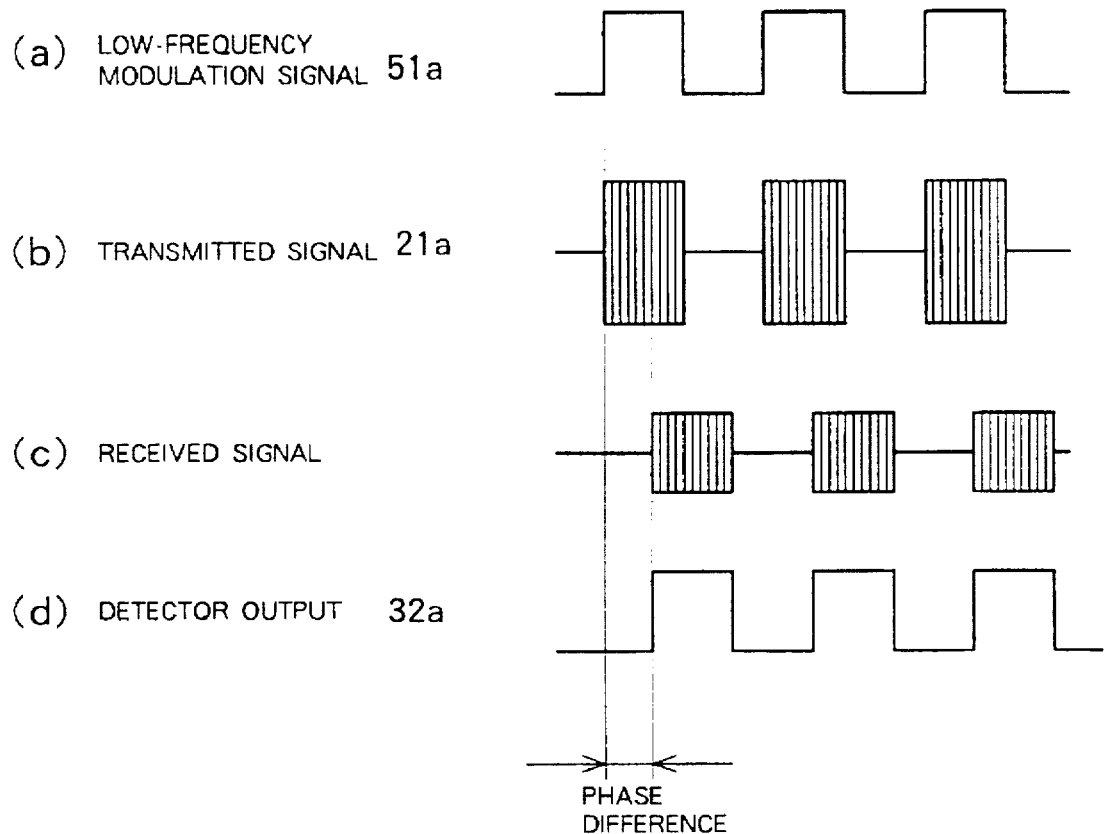
FIG. 2 is a waveform charts of received and transmitted signals in the vehicle-mounted radar system according to the invention.

IN THE DRAWINGS:

Please substitute the attached Fig. 1 and Fig. 2.

IN THE CLAIMS:

Column 8, line 19, please change "modulation modulation" to -- modulation --.

Column 8, line 23, please change "modulating modulating" to -- modulating --.

Column 8, line 39, please change "modulation modulation" to -- modulation --.

Column 8, line 43, please change "modulating modulating" to -- modulating --.

Signed and Sealed this

Eleventh Day of April, 2000

Attest:

Q. TODD DICKINSON

Attesting Officer

Director of Patents and Trademarks

United States Patent
Suzuki et al.

Patent Number: 5,694,130
Date of Patent: Dec. 2, 1997

[54] VEHICLE-MOUNTED RADAR SYSTEM AND DETECTION METHOD

[75] Inventors: Toshifumi Suzuki; Yuitsu Hayashikura, both of Wako, Japan

[73] Assignee: Honda Giken Kogyo Kabushiki Kaisha, Tokyo, Japan

[21] Appl. No.: 583,996

[22] Filed: Jan. 8, 1996

[30] Foreign Application Priority Data

Jan. 9, 1995 [JP] Japan ............................. 7-001205

[51] Int. Cl.⁶ ............................................. G01S 13/93
[52] U.S. Cl. ........................................ 342/70; 342/72
[58] Field of Search ........................... 342/70, 71, 72

[56] References Cited

U.S. PATENT DOCUMENTS

| | | | |
|---|---|---|---|
| 4,101,888 | 7/1978 | Heller et al. | 342/111 |
| 4,143,370 | 3/1979 | Yamanaka et al. | 342/72 |
| 4,148,028 | 4/1979 | Fujiki | 342/70 |
| 4,180,816 | 12/1979 | Endo et al. | 342/70 |
| 5,181,037 | 1/1993 | Komatsu | 342/70 |
| 5,302,956 | 4/1994 | Asbury et al. | 342/70 |
| 5,481,268 | 1/1996 | Higgins | 342/70 |
| 5,576,712 | 11/1996 | Bian et al. | 342/160 |

FOREIGN PATENT DOCUMENTS

| | | |
|---|---|---|
| 56-27833 | 2/1981 | Japan . |
| 56-52841 | 4/1981 | Japan . |

*Primary Examiner*—John B. Sotomayor
*Attorney, Agent, or Firm*—Lyon & Lyon LLP

[57] ABSTRACT

Modulation frequency setting device sets the modulation frequency on the basis of the vehicle speed data from a vehicle speed detector and the detected range data, causing a low frequency oscillator to generate a low frequency signal of the set frequency. A transmitter transmits an electromagnetic wave (e.g., infrared light) which have been modulated with the low frequency signal. A phase comparator detects the phase difference between the low frequency signal and a detector output, and a range operating device produces range data. Relative speed operating unit finds the relative speed based on the range data. In case of a high vehicle speed, the modulation frequency is set low to extend the detection range. If an object in a short distance is detected, the modulation frequency is set high to limit the detection range to a short range, thereby enhancing the range resolution.

18 Claims, 5 Drawing Sheets